United States Patent [19]

Okonogi et al.

[11] Patent Number: 4,668,520

[45] Date of Patent: May 26, 1987

[54] METHOD OF MANUFACTURING A WHIPPED DESSERT

[75] Inventors: Shigeo Okonogi; Hiroya Yuguchi, both of Tokyo; Yusuke Miyazaki, Yamato; Sumio Tanai, Yokohama; Minoru Ohta, Ohmiya, all of Japan

[73] Assignee: Morinaga Mild Industry Co., Ltd., Tokyo, Japan

[21] Appl. No.: 817,036

[22] Filed: Jan. 8, 1986

[30] Foreign Application Priority Data

Jan. 24, 1985 [JP] Japan ................................ 60-9942

[51] Int. Cl.$^4$ ................................................. A23L 1/04
[52] U.S. Cl. ..................................... 426/564; 426/568; 426/570; 426/571; 426/572; 426/573; 426/575
[58] Field of Search ............... 426/564, 568, 570, 571, 426/572, 573, 575, 577

[56] References Cited

U.S. PATENT DOCUMENTS

| | | | |
|---|---|---|---|
| 2,587,806 | 3/1953 | Alikonis | 426/564 |
| 2,846,314 | 8/1958 | Aichele et al. | 426/575 |
| 3,365,305 | 1/1968 | Hunter | 426/564 |
| 4,347,261 | 8/1982 | Challen et al. | 426/573 |
| 4,348,418 | 9/1982 | Smith | 426/575 |

*Primary Examiner*—Jeanette Hunter
*Attorney, Agent, or Firm*—Oblon, Fisher, Spivak, McClelland & Maier

[57] ABSTRACT

A method of manufacturing a whipped dessert; wherein a gelling agent comprising two components which may form a gel when they are mixed with each other is utilized, wherein one of two components is included in a first liquid material containing at least a whipping ingredient of an aimed dessert, the other of two components of the gelling agent is included in a second liquid material containing the remaining ingredients of the aimed dessert product; and wherein the first liquid material is whipped, the second liquid material is mixed with the whipped material for gelling.

5 Claims, No Drawings

METHOD OF MANUFACTURING A WHIPPED DESSERT

TECHNICAL FIELD

The present invention relates to a method of manufacturing a whipped dessert having good flavor, taste and/or mouthfeel, wherein air bubbles introduced are kept in stable.

BACKGROUND ART

Recently a variety kinds of whipped dessert products have been developed and placed on the market. The conventional methods of manufacturing such kinds of dessert products can be categolized into two types as described hereunder.

In the method of first type, liquid material containing all the ingredients for an aimed dessert is whipped and then whipped material is subjected to gelling by the aid of gelling agent contained therein. In this method, since the quantity of ingredients having whipping capability is insufficient for the aimed products, a considerable quantity of emulsifier is required to be added thereto. This method may, however, spoil flavor, taste, and/or mouthfeel of the products.

In the method of second type, a first liquid material consisting only of the ingredients having whipping capability among all the ingredients of an aimed dessert is whipped, then a second liquid material containing a gelling agent and all the remaining ingredients of the aimed dessert is homogeneously mixed with the whipped material and finally they are subjected to gelling. Heretofore, carrageenan, furcellaran, agar and gelatin have been known as suitable gelling agents for whipped dessert products. Such gelling agents require, however, relatively higher gelling temperatures and mixing of said whipped material and said second liquid material must be made at a temperature higher than the gelling temperature of the gelling agent. However, when the mixing is made at a relatively higher temperature, air bubbles introduced into the whipped material tend to break during the mixing procedure and thus air bubbles kept in the final products are also decreased.

The inventors of the present invention have extended their efforts to study the solution of the difficulties encountered in the conventional methods. They found the fact that acceptable dessert products having good taste, flavour and mouthfeel as well as excellent bubble keeping capability can be prepared without adding a large quantity of emulsifier when a gelling agent consisting of two components which may form a gel upon mixing is utilized, and when one of two components of the gelling agent is included in a first liquid material containing at least a whipping ingredient among all ingredients of an aimed dessert, and the other of two components of the gelling agent is included in a second liquid material containing the remaining ingredients of the aimed dessert, and when after the first liquid material is whipped the second liquid material is mixed with the whipped material at a relatively lower temperature for gelling.

The present invention is based upon this discovery.

SUMMARY OF THE INVENTION

It is an object of the invention to provide a simple method of manufacturing of whipped dessert products having good flavor, taste and/or mouthfeel and excellent bubble keeping capability.

It is another object of the present invention to provide a method of manufacturing whipped dessert products wherein whipping capability of the ingredients concerned can be utilized sufficiently without or with adding a lesser quantity of emulsifier.

In accordance with this invention, a combination of locust bean gum and xantan gum, a combination of sodium alginate and di-valent metallic ions excluding magnesium ion, and a combination of low methoxyl pectin and multi-valent ions can be used as a two-component type gelling agent.

When a combination of locust bean gum and xanthan gum is selected, 0.2% by weight or more of the total quantity of the two components to the whole quantity of the final product can be used wherein the ratio of the former to the latter falls wihin a range of 1:10~10:1 by weight.

When a combination of sodium alginate and di-valent metallic ions excluding magnesium ion is used, 0.2% by weight or more of sodium alginate to the whole quantity of the final product may be used and 0.1% by weight or more of di-valent metallic ions other than magnesium ion to the whole quantity of the final product may be used.

When a combination of low methoxyl pectin and multi-valent metallic ions is selected, 0.4% by weight or more of low methoxyl pectin to the whole quantity of the final product may be used, and 0.1% by weight or more of multi-valent metalic ions to the whole quantity of the final product may be used.

DESCRIPTION OF THE PREFERRED EMBODIMENT

A first liquid material used in the present invention can be prepared in such a manner that one of two components of a gelling agent and at least a whipping ingredient of an aimed dessert are mixed, the resulted mixture material is pasteurized or sterilized by a conventional method, and if any the pasteurized mixture material is homogenized. Said first liquid material is cooled to a temperature lower than the gelling temperature of the gelling agent used (preferably equal to or lower than 15° C.), and then subjected to whipping by a conventional method to obtain a whipped material.

A second liquid material is prepared by mixing the other of said two component of said gelling agent and the remaining ingredients of the dessert material, pasteurizing or sterilizing it by a conventional method, and if necessary to homogenize, it is cooled to a temperature lower than the temperature of the gelling agent used (preferably equal to or lower than 15° C.).

Under agitation of said whipped material, the second liquid material is added thereto at a temperature lower than the gelling temperature of the gelling agent used, gelling of the mixture of whipped material and the second material is induced to thereby obtain a whipped dessert. Any gelling agent of two-component type can be utilized in the present invention, as far as it has a gelling temperature which does not affect bubble keeping capability of the final products of whipped dessert, said three gelling agents specifically recited in the above are found preferable. Although the temperature which does not affect bubble keeping capability of the final product varies depending upon the kind of gelling agent used, it is lower than 35° C. in a combination of locust bean gum and xanthan gum.

Although any di-valent metallic ions except magnesium ion can be used in conjunction with sodium alginate as far as it can induce gelling, calcium ion is found preferable.

In the combination of locust bean gum and xanthan gum, at least 0.2% by weight of the two components to the final product should be utilized (preferably 0.2–0.8%).

In the combination of sodium alginate and di-valent ions other than magnesium ion, at least 0.2% by weight of sodium alginate to the final dessert product should be utilized (preferably 0.2–1.5%).

In the combination of low methoxyl pectin and multi-valent metallic ions, at least 0.4% by weight of low methoxyl pectin to the final dessert product should be utilized (preferably 0.4–1.5%).

It should be noted that two-component type gelling agents may be utilized in such a manner that one of the two components thereof is mixed with material containing at least a whipping ingredient of the aimed dessert material to prepare a first liquid material, and the other of the two components is mixed with the material containing the remaining ingredients of the aimed dessert material to prepare a second liquid material and then they are mixed with each other after the former is whipped. Gelling of the obtained mixed material is induced to form a whipped dessert, air bubbles introduced can be maintained not only in the final product but also in the whipped material under processing.

Any ingredients having whipping capability may be used in a first liquid material as far as they can introduce sufficient air bubbles into the aimed dessert product to the extent required thereto. However, it is preferable to use egg white, dairy cream and synthetic cream which contain milk fat or any other fats.

At least one of the two components of a gelling agent should be mixed with the whipping ingredients, and if necessary any other ingredients of the aimed dessert products may be added thereto as far as they do not affect the body, texture and appearance of the whipped material i.e., the material obtained by whipping of the first liquid material, if necessary any emulsifier and/or stabilizer may be added thereto for stabilizing the whipped body, texture and appearance of the whipped material. In the present invention, however, a lesser quantity of emulsifier and/or stabilizer is required in comparison with the conventional methods.

The ingredients to be included in the second liquid material are the other of the two components of the gelling agent and the remaining ingredients of the aimed dessert products.

It has been described the present invention in general, now the present invention will be described in more detail referring to the exemplifying tests and some preferred examples.

DESCRIPTION OF EXEMPLIFYING TESTS AND PREFERRED EMBODIMENTS

TEST 1

In this test, relationships between some gelling agents and structure of whipped desserts obtained thereby are tested.

(1) PREPARATION OF SAMPLES (a) Preparation of Samples of First Liquid Materials/Whipped Materials Six samples of first liquid materials a–f as shown in the left side columns of TABLE 1 were prepared by mixing the respective ingredients, pasteurizing the thus obtained liquids for 1 minute at 95° C. respectively, homogenizing the respective samples with conventional homogenizers under a pressure of 150–40 Kg/cm$^2$, immediately thereafter cooling the samples quickly to 5° C. and storing in a refrigerator for 16 hours at 5° C.

TABLE 1

| | INGREDIENTS OF FIRST LIQUID MATERIAL/WHIPPED MATERIAL AND SECOND LIQUID MATERIAL | | | | | | | | | | | | |
|---|---|---|---|---|---|---|---|---|---|---|---|---|---|
| | first liquid material/whipped material | | | | | | second liquid material | | | | | | |
| ingredients | a | b | c | d | e | f | A | B | C | D | E | F | G |
| cream of 45% milk fat | 997 | 994 | 990 | 988 | 998.5 | 994 | — | — | — | — | — | — | — |
| sugar | — | — | — | — | — | — | 300 | 300 | 300 | 300 | 300 | 300 | 300 |
| locust bean gum | 3.0 | — | — | — | — | — | 3.0 | — | — | — | — | — | — |
| xanthane gum | — | 6.0 | — | — | — | — | — | 6.0 | — | — | — | — | — |
| sodium alginate | — | — | 10.0 | — | — | — | — | — | 9.0 | — | — | — | — |
| low methoxyl pectin | — | — | — | 12.0 | — | — | — | — | — | 12.0 | — | — | — |
| calcium chloride | — | — | — | — | 1.5 | 6.0 | — | — | — | — | 1.5 | 6.0 | — |
| agar | — | — | — | — | — | — | — | — | — | — | — | — | 12.0 |
| water | — | — | — | — | — | — | 697 | 694 | 691 | 688 | 698.5 | 694 | 688 |
| total | 10000 | 1000 | 1000 | 1000 | 1000 | 1000 | 1000 | 1000 | 1000 | 1000 | 1000 | 1000 | 1000 | note: unit in gram

Six samples of whipped materials a–f as shown in TABLE 1 were prepared by whipping six samples a–f of said first liquid materials used whip-mixers (by Kenwood) untill over-run of the respective samples reach to 120% by volume. The temperatures of the whipped 6 samples a–f were approximately 15° C.

(b) Preparation of Second Liquid Materials

Seven samples of second liquid materials A–G as shown in the right side columns of TABLE 1 were prepared by mixing the respective ingredients shown, and adjusting the liquid samples A–G by 1000 g, respectively sterilizing them at 95° C. for 1 minute, and cooling samples A, B, C, D, E and F to 15° C. and the samples G to 50° C.

(2) MIXING

While the whipped samples a–f were respectively stirred the samples A–G were mixed thereto.

(3) RESULTS

The results of this test are shown in TABLE 2.

TABLE 2

| THE STATES OF THE FINAL PRODUCTS | | | | | | | |
|---|---|---|---|---|---|---|---|
| samples of whipped materials | samples of second liquid materials | | | | | | |
| | A | B | C | D | E | F | G |
| a | x | O | x | x | x | x | Δ |
| b | O | x | x | x | x | x | Δ |
| c | x | x | x | x | x | O | Δ |
| d | x | x | x | x | O | O | Δ |
| e | x | x | x | O | x | x | Δ |

TABLE 2-continued

THE STATES OF THE FINAL PRODUCTS

| samples of whipped materials | samples of second liquid materials | | | | | | |
|---|---|---|---|---|---|---|---|
| | A | B | C | D | E | F | G |
| f | x | x | x |  | x | x | Δ |

Note:
○: gelled upon mixing, observed excellent bubble keeping capability
x: not gelled upon mixing, observed poor bubble keeping capability
Δ: gelled upon mixing, observed poor bubble keeping capability It will be apparent to those skilled in the art that any of following combinations can form a gel when they are mixed each other:
 (i) locust bean gum and xanthan gum
 (ii) sodium alginate and calcium chloride
 (iii) low methoxyl pectin and calcium chloride It will be seen from TABLE 2 that whipped desserts having excellent bubble keeping capability can be manufactured when one of the two components of a gelling agent is added to first liquid material and the other is added to second liquid material, and they are mixed under a relatively lower temperature compared with the conventional method. It will be also noted that in the case of sample G containing ager as a gelling agent, the sample must be kept at a temperature equal to or higher than 50° C. since gelling starts at a temperature lower than 50° C. without mixing it with the samples a–f. When the sample G at a temperature equal to or higher than 50° C. is mixed with samples a–f, the temperatures after mixing thereof exceed 30° C. and each of the resulting mixtures may take a form of gel, but showed poor bubble keeping capability.

TEST 2

In this test, percentages of two components of gelling agents required for gelling of whipped dessert are tested.

(1) PREPARATION OF SAMPLES
 (a) Preparation of Samples of First Liquid Materials/Whipped Materials Five samples of first liquid materials a–e were prepared in the same manner as in TEST 1 using respective ingredients as shown in the left side columns of TABLE 3.

TABLE 3

| | INGREDIENTS OF FIRST LIQUID MATERIAL/WHIPPED MATERIAL AND SECOND LIQUID MATERIAL | | | | | | | | | | | | |
|---|---|---|---|---|---|---|---|---|---|---|---|---|---|
| | first liquid material/whipped material | | | | | second liquid material | | | | | | | |
| ingredients | a | b | c | d | e | A | B | C | D | E | F | G | H |
| cream of 30% vegetable fat | 999.9 | 999.7 | 999 | 994 | 985 | — | — | — | — | — | — | — | — |
| sugar | — | — | — | — | — | 150 | 150 | 150 | 150 | 150 | 150 | 150 | 150 |
| sodium alginate | — | — | — | — | — | 2.0 | 4.0 | 20.0 | 30.0 | — | — | — | — |
| low methoxyl pectin | — | — | — | — | — | — | — | — | — | 3.0 | 8.0 | 20.0 | 30.0 |
| calcium chloride | 0.1 | 0.6 | 1.0 | 6.0 | 15.0 | — | — | — | — | — | — | — | — |
| water | — | — | — | — | — | 848 | 846 | 830 | 820 | 846 | 842 | 830 | 820 |
| total | 1000 | 1000 | 1000 | 1000 | 1000 | 1000 | 1000 | 1000 | 1000 | 1000 | 1000 | 1000 | 1000 | note: unit in gram (b) Preparation of Samples of Second Liquid Materials

Eight samples of second liquid materials A–H were prepared in the same manner as in TEST 1 using respective ingredients as shown in the right columns of TABLE 3.

(2) MIXING

The samples of whipped materials a–e and samples A–H were mixed in the same manner as in TEST 1.

(3) RESULTS

The results of this test are shown in TABLE 4.

TABLE 4

THE STATE OF THE FINAL PRODUCTS

| samples of whipped materials | samples of second liquid materials | | | | | | | |
|---|---|---|---|---|---|---|---|---|
| | A | B | C | D | E | F | G | H |
| a | x | x | x | x | x | x | x | x |
| b | x | x | x | x | x | ○ | ○ | ○ |
| c | x | x | x | x | x | ○ | ○ | ○ |
| d | x | ○ | ○ | ○ | x | ○ | ○ | ○ |
| e | x | ○ | ○ | ○ | x | ○ | ○ | ○ |

Note:
○: gelled upon mixing, observed excellent bubble keeping capability
x: not gelled upon mixing, observed poor bubble keeping capability The concentration of calcium ion in the mixtures of sample b and each of samples A–H were 0.01 wt. % and the concentration of calcium ion in the mixtures of sample d and each of samples A–H were 0.1 wt. %.

In TABLE 4, it is seen that when the combination of sodium alginate and calcium ions was used as a gelling agent, gelling was induced and excellent bubble keeping capability was observed when the concentration of sodium alginate was equal to or higher than 0.2% by weight and that of calcium ions was equal to or higher than 0.1% by weight after mixing the samples of whipped materials and second liquid materials.

Also when the combination of low methoxyl pectin and calcium ions was used as a gelling agent, gelling was induced and excellent bubble keeping capability was observed when the concentration of low methoxyl pectin was 0.4% by weight and concentration of calcium ions was equal to or higher than 0.01% by weight after mixing of the samples of whipped materials and second liquid materials.

TEST 3

In this test, percentages of locust bean gum and xanthan gum and the ratio of the former to the latter required for gelling of the whipped dessert were tested.

(1) PREPARATION OF SAMPLES

Eight samples of first liquid materials and whipped materials i–viii and eight samples of second liquid materials 1–8 were prepared in the same manner as in TEST 2 using respective ingredients as shown in TABLE 5.

TABLE 5

| | first liquid material/whipped material | | | | | | | |
|---|---|---|---|---|---|---|---|---|
| ingredients | 1 | 2 | 3 | 4 | 5 | 6 | 7 | 8 |
| sugar | 300 | 300 | 300 | 300 | 300 | 300 | 300 | 300 |
| locust been gum | 4.0 | 4.0 | 1.4 | 0.2 | 2.0 | 2.0 | 0.8 | 0.2 |
| water | 696 | 696 | 698.6 | 699.8 | 698 | 698 | 699.2 | 699.8 |
| total | 1000 | 1000 | 1000 | 1000 | 1000 | 1000 | 1000 | 1000 |

TABLE 5-continued

| ingredients | second liquid material | | | | | | | |
|---|---|---|---|---|---|---|---|---|
| | i | ii | iii | iv | v | vi | vii | viii |
| cream of 30% vegetable oil | 999.8 | 998.6 | 996 | 996 | 999.8 | 999.2 | 998 | 998 |
| xanthan gum | 0.2 | 1.4 | 4.0 | 4.0 | 0.2 | 0.8 | 2.0 | 2.0 |
| total | 1000 | 1000 | 1000 | 1000 | 1000 | 1000 | 1000 | 1000 |
| whipped state after mixing | x | | O | x | x | x | x | x |

(2) MIXING

Samples 1-8 and samples i-viii were mixed in the same manner as in TEST 2.

(3) RESULTS

The results of this test are also shown in TABLE 5 wherein ○ indicates that gelling was induced when samples of the second liquid materials were mixed with the samples of whipped materials and excellent bubble keeping capability was observed, and × denotes that gelling was not induced and poor bubble keeping capabilitry was observed.

In TABLE 5, good results were obtained when the concentration of total quantity of the two components was equal to or higher than 0.2% by weight and the ratio of the former to the latter falls within a range of 1:10-10:1.

TEST 4

In this test, the influence of the temperatures at the mixing of whipped materials and second liquid materials was tested.

(1) PREPARATION OF SAMPLES (a) Preparation of Samples of Whipped Material

A sample of whipped material in the amount of 200 g was prepared, by mixing 198.8 g of cream containing 45% of milk fat, with 1.2 g of locust bean gum, homogenizing, pasteurizing and whipping them in the same manner as in TEST 2. The thus obtained sample was divided into 4 lots, 50 g each, and stored at 15° C.

(b) Preparation of Samples of Second Liquid Materials

A sample of second liquid material in the amount of 1000 g was prepared by mixing 180 G of sugar, 3.6 g of xanthan gum and 816.4 g of water, adjusting the resulted solution by 1000 g, pasteurizing it for 10 minutes at 85° C., and was devided into 4 lots, 250 g each. Samples in 4 lots were kept at 80° C., 60° C., 40° C. and 15° C. respectively. Samples in 4 lots of the second liquid material and samples of whipped material were mixed in accordance with the combinations as shown in TABLE 6 while the 4 lots of whipped material were respectively stirred.

(4) RESULTS

The results of this test are shown in TABLE 6.

TABLE 6

| temperatures of second liquid material (°C.) | temperatures of whipped material (°C.) | temperatures after mixing (°C.) | states of the final product |
|---|---|---|---|
| 80 | 15 | 69 | x |
| 60 | 15 | 52 | Δ |
| 40 | 15 | 35 | O |
| 15 | 15 | 15 | ⊚ |

Note:
O: gelled upon mixing, observed acceptable bubble keeping capability
Δ: insufficiently gelled upon mixing, observed partial break of air bubbles
x: not gelled upon mixing, observed complete break of air bubbles
⊚: gelled upon mixing, observed excellent bubble keeping capability In TABLE 6, it is seen that when mixing was made at a temperature higher than the gelling temperature of the combination of locust bean gum and xanthan gum, poor bubble keeping capability were observed, and when mixing was made at a temperature equal to or lower than the gelling temperature thereof (equal to or lower than 50° C.), acceptable bubble keeping capability was observed.

It was anticipated that a relatively higher temperature would be required for mixing samples containing xanthan gum and samples containing locust bean gum, since the gelling temperature of the gelling agent in that combination is relatively high. However, it has been found that good results were obtained even though they were mixed at a considerably lower temperature since the two components of the gelling agent in this invention are contained in separate materials which are mixed at the final step whereat gelling is induced.

Having described exemplifying tests, now present invention will be further explained hereunder based on some of the preferred embodiments of the present invention.

EXAMPLE 1

| [Ingredients of whipping material] | |
|---|---|
| vegetable fat cream (30%) | 49.75 Kg |
| emulsifier | 0.1 Kg |
| locust bean gum | 0.15 Kg |
| In total | 50 Kg |
| [Ingredients of second liquid material] | |
| sugar | 22.5 Kg |
| xanthan gum | 0.45 Kg |
| strawberry juice | 15.0 Kg |
| citric acid | 0.15 Kg |
| flavour | 0.15 Kg |
| water | 61.75 Kg |
| In total | 100 Kg |

The ingredients of whipped material was mixed to form a homogeneous liquid which was pasteurized for 10 minutes at 85° C. The pasteurized liquid was subjected to two stage homogenization under pressures of 150 Kg/cm$^2$ and 40 Kg/cm$^2$, and then it was cooled quickly to 5° C. After the obtained liquid was stored for 16 hours at 5° C., it was whipped with a pressure beater (by Air-o-matic) untill its overrun reaches to 120% (by volume) thereby a whipped material was prepared.

The ingredients of second liquid material shown in the above were mixed to form a homogeneous liquid. The thus obtained liquid was sterilized for 10 minutes at 85° C., thereby a second liquid material was obtained.

Stirring the whipped material, the second liquid material previously prepared was mixed therewith and 80 ml of the obtained mixture was poured into each of 100 ml content plastic containers. After the containers were sealed hermetically with lids they were cooled to 5° C., thereby solidified whipped dessert products were obtained.

Excellent bubble keeping capability was observed in the final products, and taste, flavour and mouthfeel thereof were very good.

EXAMPLE 2

| [Ingredients of whipping material] | |
|---|---|
| egg white | 49.0 Kg |
| low methoxyl pectin | 1.0 Kg |
| In total | 50 Kg |
| [Ingredients of second liquid material] | |
| sugar | 25.0 Kg |

| | |
|---|---|
| -continued | |
| cocoa | 6.0 Kg |
| cow's milk | 69.0 Kg |
| In total | 100 Kg |

The ingredients of whipping material shown in the above were homogeneously mixed, and the resulted liquid was pasteurized for 10 minutes at 85° C. Then the pasteurized liquid was subjected to two stage homogenization under pressures of 150 Kg/cm$^2$ and 40 Kg/cm$^2$, and was cooled to 5° C. quickly. After storing the liquid for 16 hours at 5° C., it was whipped with the same pressure beater used in Example 1 until its overrun reaches to 100% (by volume) thereby whipped material was obtained.

Using the ingredients of second liquid material shown in the above, a second liquid material was prepared in the same manner as in Example 1.

Using the whipped material and the second liquid material previously prepared, a plurality of whipped dessert products were obtained in the same manner as in Example 1.

The dessert products obtained showed excellent bubble keeping capability and had very good taste, flavour and mouthfeel.

In accordance with the present invention, air bubbles can be kept stable in the final products since the whipped material and the second liquid material may be mixed under a relatively lower temperature compared with the conventional methods.

Also spoiling of taste, flavour and mouthfeel which were encountered in the conventional methods due to addition of emulsifier and/or stabilizer can be eliminated, since the present invention requires none or lesser quantity of emulsifier and/or stabilizer.

Furthermore the method of present invention is simple, and thus air bubbles introduced into the whipped material and into the final products can be effectively maintained and therefore whipped dessert products having good taste, flavour and mouthfeel can be continuously prepared in the scale of mass-production.

What is claimed is:

1. A method of manufacturing a whipped dessert product, wherein a first liquid material containing at least a whipping ingredient is whipped, then a second material containing at least a gelling agent is mixed with the first material to thereby gel the mixture of the first and second materials, which comprises:
   (a) whipping said first liquid material, which comprises, in addition to said whipping ingredient, a single component of a two-component gelling agent and being capable of forming a gel when said two components are mixed, said first liquid material being cooled to a temperature lower than the gelling temperature of the gelling agent used, prior to said whipping; and
   (b) adding to said whipped first material, and mixing therewith, said second material, which comprises the other component of said gelling agent; said second material being cooled to a temperature lower than the gelling temperature of the gelling agent used, prior to said addition and mixing; and wherein the two components of gelling agent used in steps (a) and (b) comprise locust bean gum and xanthan gum, the percentage of the total quantity of the two components included in a final product being at least 0.2% by weight, and the ratio of the two components being within a range of about 1:10–10:1 by weight.

2. The method of manufacturing a whipped dessert according to claim 1, wherein said gelling agent is employed in the amount of 0.2 to 0.8% by weight of final product.

3. The method of manufacturing a whipped dessert according to claim 1, wherein said shipping ingredient of said first liquid material is selected from the group consisting of egg white, dairy cream and synthetic cream containing milk fat or any other fat.

4. The method of manufacturing a whipped dessert according to claim 1, wherein said liquid material is cooled to a temperature which is equal to or lower than 15° C. prior to whipping.

5. The method of manufacturing a whipped dessert according to claim 1, wherein said second liquid material is cooled to a temperature which is equal to or lower than 15° C. prior to adding and mixing said whipped first material therewith.

* * * * *

UNITED STATES PATENT AND TRADEMARK OFFICE
CERTIFICATE OF CORRECTION

PATENT NO. : 4,668,520
DATED : May 26, 1987
INVENTOR(S) : Okonogi et al.

It is certified that error appears in the above-identified patent and that said Letters Patent is hereby corrected as shown below:

| Col. | Line | |
|---|---|---|
| 1 | 12 | delete "kinds", |
| | 15 | delete "categolized" and insert --categorized--, |
| | 17 | delete "liquid material" and insert --a liquid material--, |
| | 49 | delete "flavour" and insert --flavor--, |
| 2 | 7 | delete "xantan" and insert --xanthan--, |
| | 16 | delete "wihin" and insert --within--, |
| | 32 | delete "EMBODIMENT" and insert --EMBODIMENTS--, |
| | 39 | delete "and if any" and insert --and, if any,--, |
| 3 | 16 | delete "may" and insert --must--, |
| | 17 | delete "with material" and insert --with the material--, |
| | 38 | delete "aimed" and insert --desired--, |
| | 67,68 | delete "It has been described the present invention in general, now" and insert --The present invention has been described in general. Now--, |
| 4 | 42 | delete "used" and insert --using--, |
| | 43 | delete "untill over-run" and insert --until overrun--, |
| 7 | 21 | delete "capabilitry" and insert --capability--, |
| | 46 | delete "devided" and insert --divided--, |
| 8 | 2 | delete "were observed" and insert --was observed--, |
| | 16 | delete "whereat" and insert --where at--, |

UNITED STATES PATENT AND TRADEMARK OFFICE
CERTIFICATE OF CORRECTION

PATENT NO. : 4,668,520
DATED : May 26, 1987
INVENTOR(S) : Okonogi et al

It is certified that error appears in the above-identified patent and that said Letters Patent is hereby corrected as shown below:

| Col. | Line | |
|---|---|---|
| 8 | 37 | delete "whipped material was" and insert --whipping material were--, |
| | 44 | delete "untill" and insert --until--, |
| | 58 | delete "flavour" and insert --flavor--, |
| 9 | 21 | delete "products were" and insert --products was--, |
| | 25,32,41 | delete "taste, flavour" and insert --taste, flavor--, |
| 10 | 32 | delete "shipping" and insert --whipping--, |
| TABLE 1 | | delete "xanthane gum" and insert --xanthan gum--, At a, total delete "10000" and insert --1000--, |
| TABLE 2 | | At D,f insert --0--, |
| TABLE 5 | | delete "locust been" and insert --locust bean--, At ii, whipped state after mixing insert --0--, |
| EXAMPLE 1 | | delete "flavour" and insert --flavor--, |

Signed and Sealed this

Tenth Day of May, 1988

Attest:

DONALD J. QUIGG

Attesting Officer     Commissioner of Patents and Trademarks